(12) United States Patent
Ananian

(10) Patent No.: US 7,617,131 B2
(45) Date of Patent: Nov. 10, 2009

(54) WEB-BASED MARKETING SYSTEM

(75) Inventor: John Ananian, Miyagi (JP)

(73) Assignee: Haven Networks, Inc., Parksville, BC (CA)

( * ) Notice: Subject to any disclaimer, the term of this patent is extended or adjusted under 35 U.S.C. 154(b) by 314 days.

(21) Appl. No.: 11/370,140

(22) Filed: Mar. 6, 2006

(65) Prior Publication Data

US 2006/0200390 A1 Sep. 7, 2006

Related U.S. Application Data

(60) Provisional application No. 60/659,510, filed on Mar. 7, 2005.

(51) Int. Cl.
*G06Q 30/00* (2006.01)
(52) U.S. Cl. .......................................... 705/26; 705/37
(58) Field of Classification Search .................. 705/26, 705/14, 37
See application file for complete search history.

(56) References Cited

U.S. PATENT DOCUMENTS 6,490,602 B1 * 12/2002 Kraemer ...................... 715/236

OTHER PUBLICATIONS

Mattison, David, Lights! Camera! Action! Searcher. Medford: Feb. 2004. vol. 12, Iss. 2; p. 18, downloaded from ProQuest Direct on the Internet on Aug. 1, 2008, 17 pages.*

* cited by examiner

*Primary Examiner*—James Zurita
(74) *Attorney, Agent, or Firm*—Alleman Hall McCoy Russell & Tuttle LLP

(57) ABSTRACT

A computerized marketing system and method for use with a client device configured to execute a browser and display a web page downloaded from a third party server via a Uniform Resource Locator (URL) are provided. The method typically includes receiving at a catalog server the URL of a recently downloaded web page from a client device, and serving a catalog clip associated with the URL from the catalog server to the client device.

25 Claims, 7 Drawing Sheets

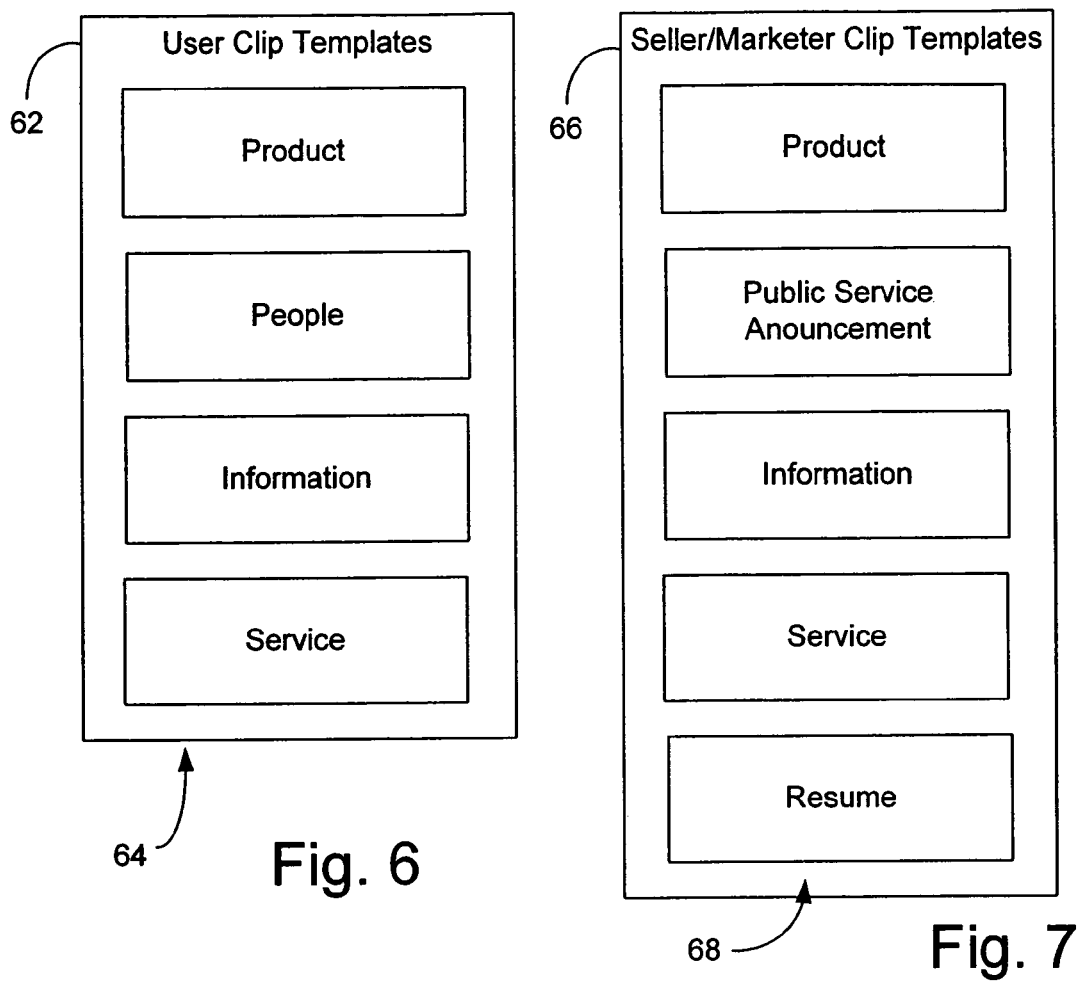
Fig. 6
Fig. 7
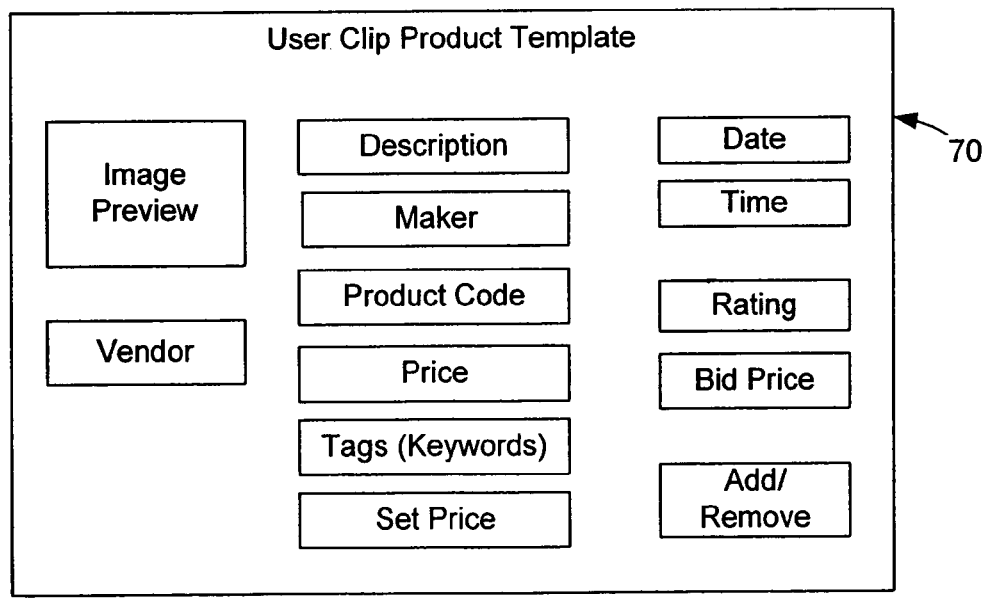
Fig. 8

WEB-BASED MARKETING SYSTEM

CROSS-REFERENCE TO RELATED APPLICATIONS

This application is based on and claims priority to U.S. Provisional Application Ser. No. 60/659,510, entitled ORGANIC WEB MARKETING, filed Mar. 7, 2005, the entire disclosure of which is herein incorporated by reference.

TECHNICAL FIELD

The present invention relates generally to marketing systems, and more particularly to web-based marketing systems.

BACKGROUND

Typically, a consumer may spend countless hours searching the internet to collect information about a particular point of interest. In many instances, the consumer may have to search a plurality of websites in order to collect all of the information. A consumer may also contact various peers via an instant messaging program or a social network to share opinions regarding a point of interest.

Meanwhile, E-business merchants and marketers devote numerous resources to identify consumer intentions. Based on these intentions, merchants and marketers attempt to implement effective approaches to attract consumers to their websites in order to market and sell their products and/or services.

Traditionally, E-business merchants and marketers have applied a variety of techniques to attract customers to their products and services. One technique is to display banner advertisements on a third party website to attract customers to their own website. However, the process of negotiating with a third party website to acquire advertising space can be arduous and certain websites which may be desirable to advertise on may not allow banner advertisements.

Another technique which bypasses negotiating with a third party website is the pop-up advertisement. The pop-up advertisement can be linked to a particular website so that when the website is viewed the pop-up advertisement is initiated. One problem with pop-up advertisements is that they have reached a critical mass on the internet. Consumers usually disregard pop-up advertisements because they encounter such a large quantity of them. Moreover, many internet browsers have integrated pop-up advertisement blocking software into their programs. As a result, pop-up advertising has become an outdated form of internet marketing.

In addition, market research firms have begun to implement behavioral targeting, by attempting to track a user's behaviors over tracked multiple websites. However, current tracking systems typically require that the user device accept and keep cookies from third parties, which is increasingly disfavored among some computer users as raising security and privacy concerns. Further, it is difficult to tell if a detected click is intentionally engaged in by a user, or is effected by a robot, which calls the validity of such tracking statistics into question.

SUMMARY OF THE INVENTION

A computerized marketing system for use with a client device configured to execute a browser and display a web page downloaded from a third party server via a Uniform Resource Locator (URL) is provided. The system typically includes a catalog clipping registry database configured to store a plurality of catalog clips, each catalog clip including data relating to a product and being indexed by a URL of a web page. The system also typically includes a catalog server being linked to the database and configured to serve catalog clips from the database to the client via a computer network for display on a catalog display pane on the client device. The system further typically includes a catalog client executable on the client device, the catalog client being configured upon execution to display a catalog tool configured to enable a user to create a user catalog clip that is associated with the URL of the web page, and store the catalog clip in the catalog clipping registry database, the catalog client further being configured to communicate the URL of each webpage displayed on the browser to the catalog server, and request catalog clips from the catalog server for display in the catalog display pane. The catalog server is typically configured to receive a message from the catalog client that a web page at a URL has been downloaded to the browser, and in response the catalog server is configured to serve catalog clips indexed by that URL from the catalog clipping registry database to the catalog display pane.

According to another aspect of the invention, the marketing system may include a first window configured to display a web page from a third party web server, the web page being addressable at a Uniform Resource Locator (URL), and a second window configured to display a plurality of catalog clips. Each catalog clip is typically stored in a catalog clipping registry database, and each clip is typically associated with the URL of the web page and served by a catalog server system in response to the downloading of the web page from the third party server.

According to another aspect of the invention, a computerized marketing method for use with a client device configured to execute a browser and display a web page downloaded from a third party server via a Uniform Resource Locator (URL) is provided. The method typically includes receiving at a catalog server the URL of a recently downloaded web page from a client device, and serving a catalog clip associated with the URL from the catalog server to the client device.

BRIEF DESCRIPTION OF DRAWINGS

The invention is illustrated by way of example and not by way of limitation in the figures of the accompanying drawings, in which the like references indicate similar elements and in which:

FIG. 6 is a block diagram showing types of user clip templates of the marketing system of the present invention.

FIG. 7 is a block diagram showing types of seller and marketer clip templates of the marketing system of FIG. 1.

FIG. 8 is a block diagram showing an example user clip product template of the marketing system of FIG. 1.

DETAILED DESCRIPTION OF THE EMBODIMENTS

Figure 1:
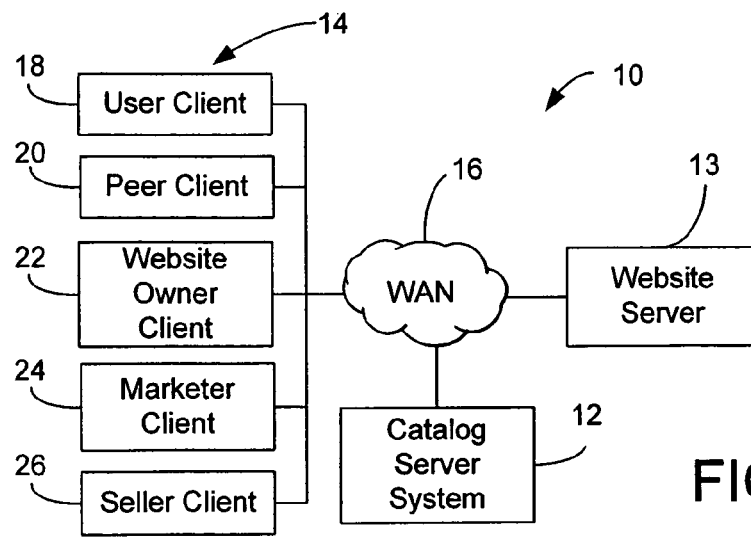
FIG. 1 is a block diagram showing client interaction over a network with the marketing system according to one embodiment of the present invention.

FIG. 1 shows a computerized marketing system 10 according to one embodiment of the present invention. Marketing system 10 typically includes a catalog server system 12 configured to communicate with one or more client devices 14 via a wide area computer network 16, such as the internet. Client devices 14 may include a user client 18, as well as one or more peer clients 20, website owner clients 22, seller clients 26, and marketer clients 24. The computerized marketing system 10 may also include one or more website servers 28.

Figure 2:
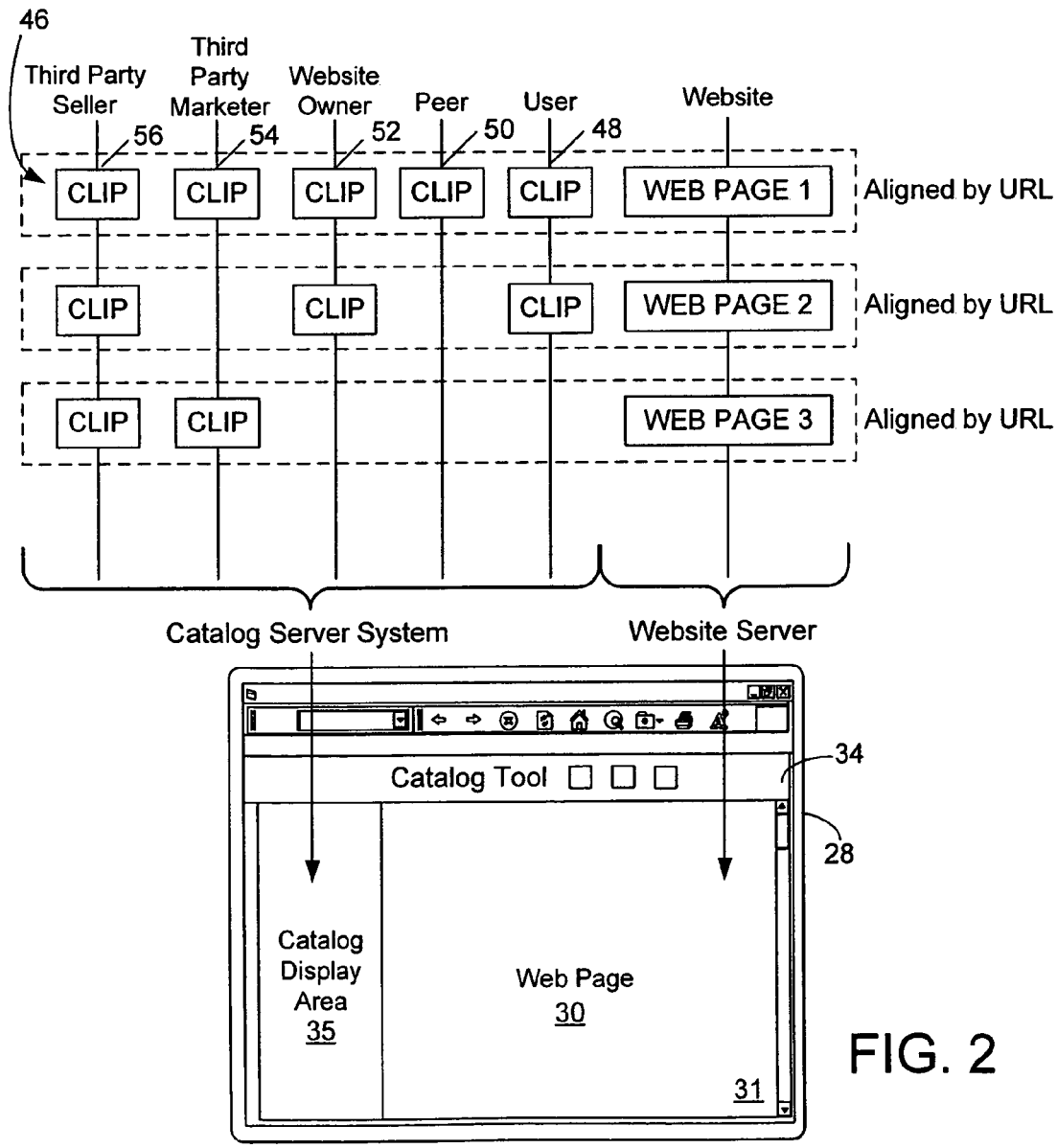
FIG. 2 is a schematic diagram showing URL aligned clips posted by clients of the marketing system of FIG. 1.
Figure 3:
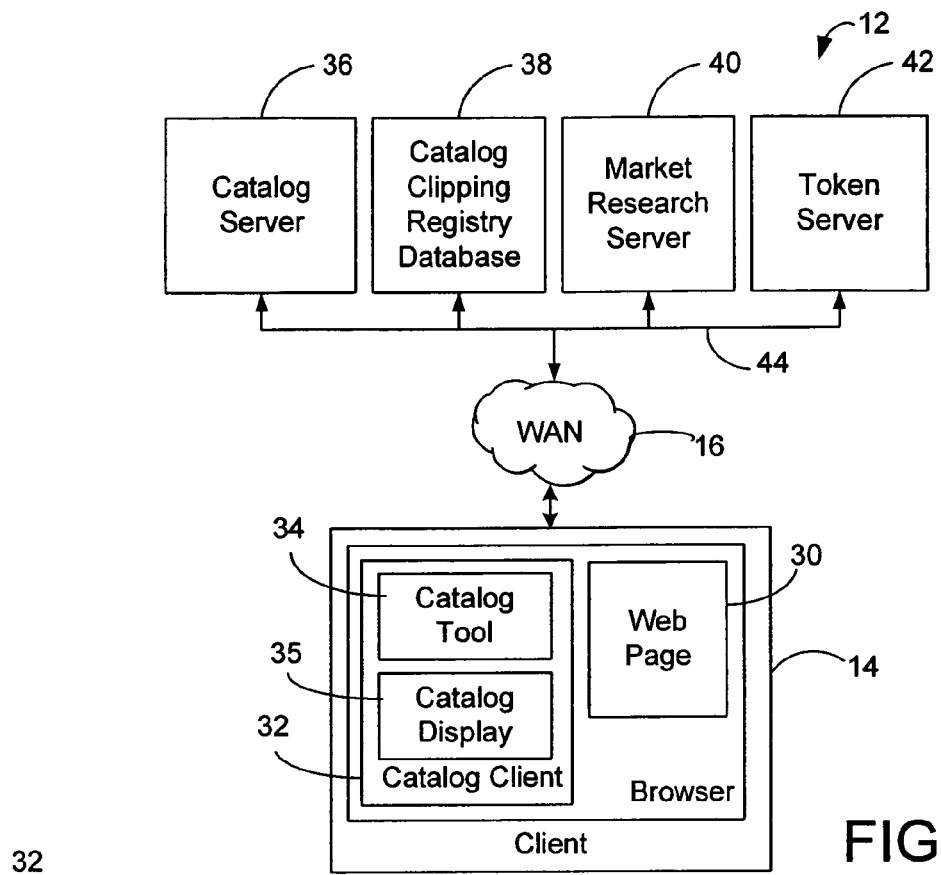
FIG. 3 is a schematic diagram showing the network components accessed by the marketing system of FIG. 1.

As shown in FIGS. 2-3, each client device 14 is typically configured to execute a browser 28 configured to display a web page 30, and is also configured to execute a catalog client 32, configured to display a catalog tool interface 34 and a catalog display area 35. The catalog display area is typically a pane within browser 28, adjacent a web page pane 31 in which web page 30 is displayed; however, it will be appreciated that the catalog display area and/or catalog tool interface may be provided separately from browser 28.

Catalog server system 12 typically includes a catalog server 36, catalog clipping registry database 38, market research server 40, and a token server 42, all configured to communicate via a local area network 44, and through wide area network 46.

Catalog clipping registry database 38 is configured to store a plurality of catalog clips, shown generally at 46. Each catalog clip typically includes data relating to a product and is indexed within the database by the URL of web page 30. Clips from various sources may be stored within the database. For example, user clips 48, peer clips 50, website owner clips 52, and third party seller and marketer clips 54, 56 may be stored in the database 38 of catalog server system 12.

Catalog server 36 is configured to serve catalog clips 46 from catalog clipping registry database 38 to catalog display area 35 of catalog client 32. The catalog server serves catalog clips associated with a specific URL which the catalog server receives when a webpage is downloaded to the browser.

The catalog server is linked to the database and is configured to serve catalog clips from the database to the client via a computer network for display on a catalog display pane on the client device.

The catalog client is typically executable on the client device, and is configured upon execution to display a catalog tool configured to enable a user to create a user catalog clip that is associated with the URL of the web page. The catalog clip is sent by the catalog client to the catalog server, and stored in the catalog clipping registry database. The catalog client is also configured to communicate a message containing the URL of each webpage displayed on the browser to the catalog server via the computer network, and to request catalog clips from the catalog server for display in the catalog display pane.

The catalog server is configured to receive the message from the catalog client containing the URL of the web page that has been downloaded to the browser; and in response, the catalog server is configured to serve catalog clips indexed by that URL from the catalog clipping registry database to the catalog display pane.

Market research server 40 is configured to track and store data relating to clients creating, viewing, and broadcasting catalog clips as well as client demographic information. Typically, users are prompted to enter demographic information via the user client, and the information is stored on the market research server, or a database associated therewith. The market research server is configured to maintain statistics on the clips (including the user-specific user clips and peer clips) associated with each user client, by URL. The demographic information and clip information, as well as the URL of the web page being viewed, is used by the market research server to select marketer clips to serve to the fee-based catalog display area of the user clients. Marketers may place orders for fee-based clip displays and view real-time marketing information via the marketer client 24 stored in the market research server via the marketer client 24.

Token server 42 is configured to manage the sale of catalog clips in the fee-based display area (42 shown in FIG. 4) of catalog client 32. Tokens may be purchased by an advertiser (i.e., seller, marketer, or website owner) and used in order to post catalog clippings in the fee-based display area. Furthermore, the token server is configured to allocate distribution of revenues taken in from fee-based clip displays based on a revenue sharing model, as described below.

Figure 4:
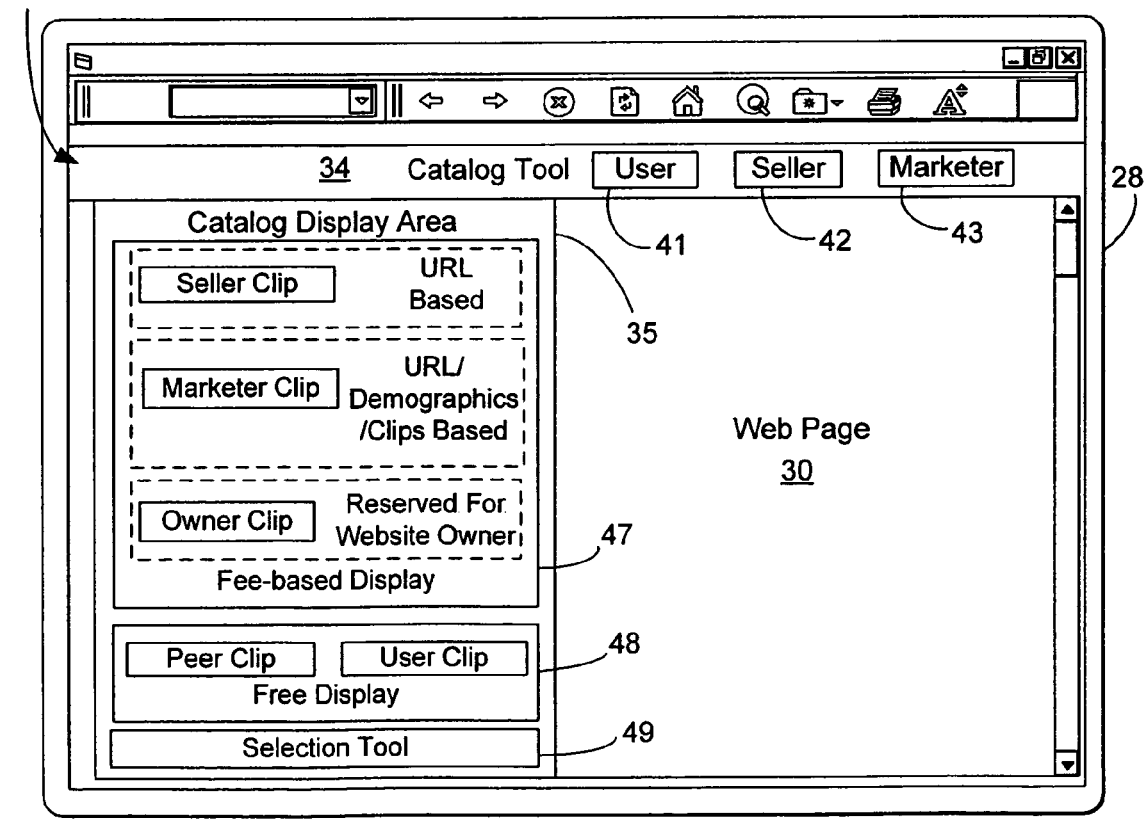
FIG. 4 is an example graphical user interface of the marketing system of the present invention shown concurrently with a typical web browser application.

As shown in FIG. 4, catalog client 32 is typically configured to be integrated into browser 28 (as a module, for example) and to be displayed via the browser concurrently with web page 30. Catalog client 32 is configured to cause the browser to display a catalog display area 35 and a catalog tool 34.

Catalog display area 35 enables a user to view a selection of URL-associated catalog clips 46 displayed in either a fee-based area 47 or in a fee-free area 48. Typically the user is able to select the type of clips that are to be displayed the fee-free area. Most typically, user clips 48 are displayed in the fee free area by default, and peer clips 50 are displayed at the user's option. In addition, the catalog client may be configured to enable to user to broadcast user clips via the catalog server to be displayed on a peer client device via peer client 20.

Catalog clips displayed in the fee-based area may be further organized into categories which include website owner clips 52, marketer clips 54, and seller clips 56. This arrangement can enable a user to seek out catalog clips according to their specific intensions in a timely manner.

In some embodiments, placement of the catalog clips in the fee-based catalog display area may be preferential. For example, clips posted by the website owner may be placed at the top of the display or may be highlighted in various other ways. Alternatively, preference may be given to sellers who pay more tokens to display their clips, similar to the practice employed by many search engines who post results according to the highest bidding website.

Catalog display area 35 also includes selection tool 49 which is configured to enable a user to manipulate the organization and presentation of catalog clips 46 to a desired order.

Figure 5:
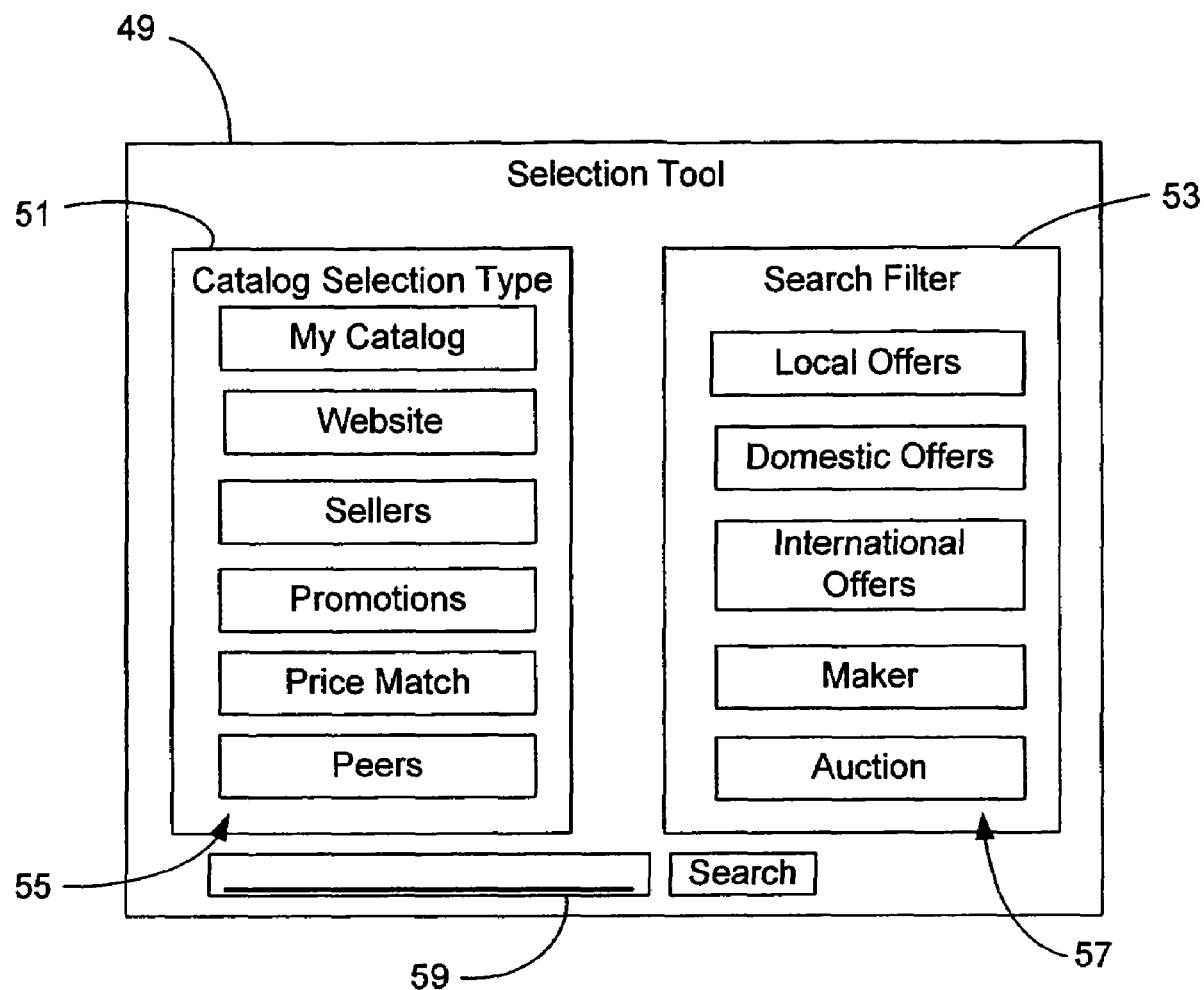
FIG. 5 is a block diagram showing the components of a selection tool of the marketing system of FIG. 1.

As shown in FIG. 5, an exemplary selection tool 49 includes a catalog selection type menu 51, a search filter menu 53, and a keyword search tool 59.

Selection type menu 51 includes various catalog selections generally referred to at 55. A user may select a specific catalog selection such as "My Catalog" in order to view all clips created by the user associated with a specific URL. As another example, a user may select the "Promotions" catalog selection to view any current promotional clips posted by marketers or sellers that are aligned with a specific URL. As another example, a webpage may display a certain product; and a user may select the "Price Match" catalog selection to view URL aligned clips offering price matching or potentially lower prices from third party sellers. By using this feature, buyers can clip a product and flag it for price matching if they want to alert other (e.g., local) merchants of their price preference. In turn the local merchant may respond by offering the product to the buyer at the buyer's target price.

Search filter menu 53 includes various filters generally referred to at 57. A user may select one or more search filters from the search filter menu to refine a catalog clip search request. As an example, a user may select the "Maker" search filter to search for catalog clips containing product information from a specific manufacturer. Additionally, a user may also select the "Domestic Offers" filter so that only domestic sellers showing clips of products from the specified manufacturer are displayed.

Although several example catalog selection types and search filters are displayed, it should be appreciated that numerous variations of catalog selection types and filters may be offered in the associated menus. In some embodiments, the catalog selection type and search filter menus may be in the form of drop down menus or scrollable lists from which selections may be chosen.

Keyword search tool 59 is configured to allow a user to search for clips containing specific keywords/TAGs. A user may employ the catalog selection type menu and/or the search filter menu to manipulate their keyword search in order to return a desired result. The keyword search tool returns a list of clips in the display area which most nearly match the contents of the search request. In this way a user may navigate through various catalogs to locate desired catalog clips.

Catalog tool 34 includes a user client tab 41, a seller client tab 42, and a marketer client tab 43. These tabs enable a client to access menus which feature tools to aid in operation of the catalog client. The user menu includes tools for creating clips, managing clips, and managing a peer network. The seller menu includes tools for creating clips, managing clips, managing tokens, and a clip analysis tool. The marketing menus includes tools for marketing analysis, creating clips, etc.

As shown in FIG. 6, exemplary user clip template menu 62 includes clip templates generally referred to at 66, which a user may access to create various catalog clips. The user clip template menu includes product, people, information, and service templates. Each of these templates contains customized fields that enable a user to create clips for products, people, information, and services that are featured on web pages displayed on the users computing device.

As shown in FIG. 7, exemplary seller/marketer clip template menu 66 typically includes clip templates, generally referred to at 68, which may be selected by a user to access templates tailored to enable a marketer or seller to create marketer/seller clips 54, 56 for products, public service announcements, information, services, and resumes.

FIG. 8 depicts one example template, a user clip product template 70, which may be selected via the product option of user clip template menu 62. User clip product template 70 typically includes data such as an image preview/thumbnail of the product, the name of the vendor who is offering the product, a textual description of the product, the name of the maker (manufacturer) of the product, a product code such as a Universal Product Code (UPC), European Article Number (EAN), Japan Article Number (JAN), SKU, etc. a set price (the price at which the vendor is offering the product), and tags, which are user-generated keywords that the user may assign to each clip for the purpose of organization. Information such as the date and time the clip was created, a user or peer rating for the product, and a current bid price for the product may also be included. An add/remove button may also be include by which the user may add or remove the clip from the catalog display pane.

Figure 9:
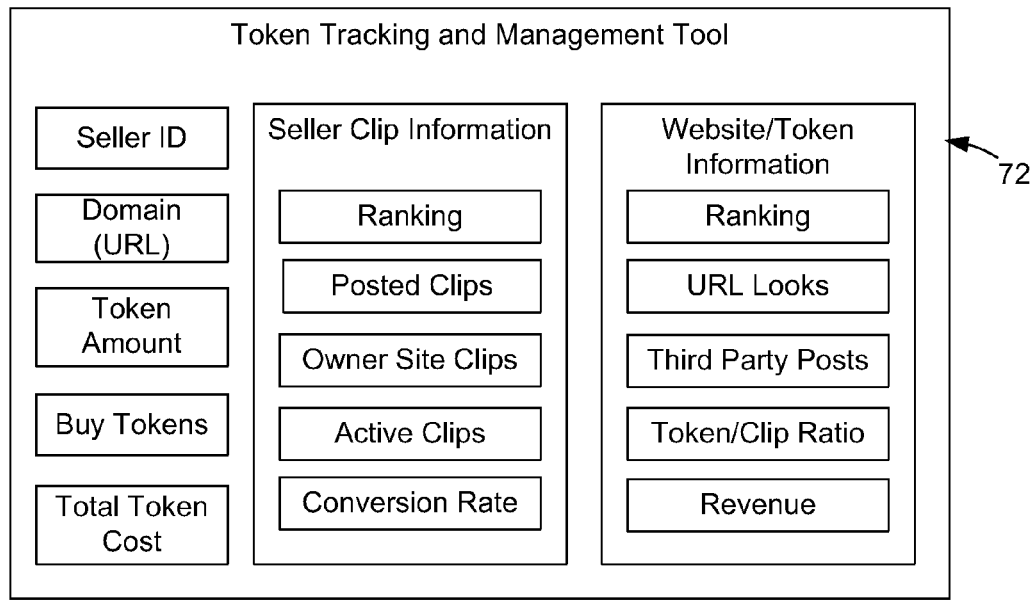
FIG. 9 is a block diagram showing the components of a token tracking and management tool of the marketing system of FIG. 1.

FIG. 9 depicts a token tracking and management tool 72 configured to be served by token server 42. For a given seller (or marketer), the token tracking and management tool is configured to display the sellerID, and a URL at which the seller is advertising. Tool 72 is also configured to display a token amount, and includes a mechanism to enable the seller to buy new tokens, and view the total token cost for the present transaction. Tool 72 also includes an area for display of seller clip information, such as ranking, posted clips, owner site clips, active clips, and a conversion or click-thru rate for posted clips. Tool 72 also includes an area for the display of website and token information, including ranking of the website by hits, total URL looks or views, third party posts, a token to clip ratio for the URL, and revenue generated by clips associated with the URL.

Figure 10:
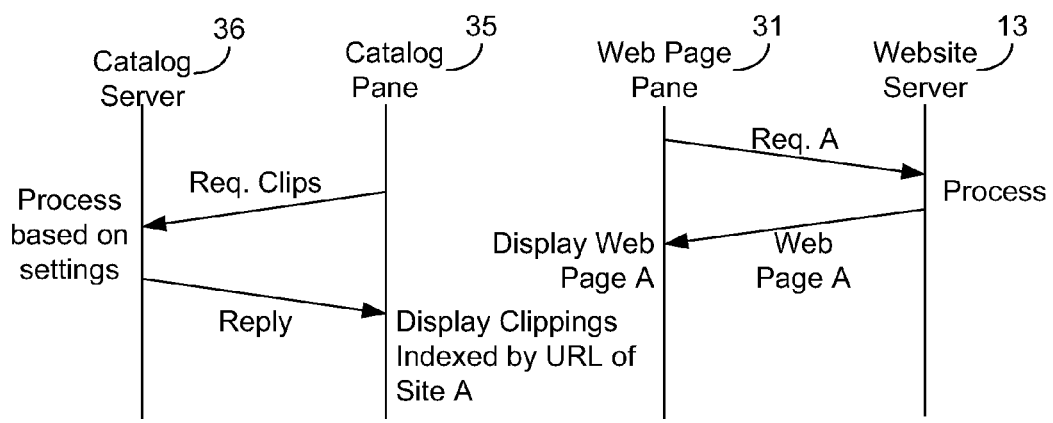
FIG. 10 is a networking diagram showing the process of retrieving and displaying clips associated to a particular URL, according to the marketing system of FIG. 1.

FIG. 10 depicts a typical interaction between catalog server 36, catalog pane 35, web page pane 31, and website server 13. Initially, web page pane 31 of browser 28 sends a request to website server 13 to download a web page 30 located at a URL. The website server responds by transmitting the website data to the browser for display on the web page pane. The catalog client 31 determines the URL of the web page, and sends a request to the catalog server for clippings that are indexed in the catalog clipping registry database according to the URL for the web page. The request is processed by the catalog server, based on the URL of the web page, current user settings (including user demographic information and user catalog display settings entered via selection tool 49) that are stored on the catalog server. Typically, all catalog clips that are associated with the URL are presented to the user via the catalog pane, and the user may filter these using the selection tool. Alternatively, the catalog server may select a subset of the catalog clips associated with the URL for display in the catalog pane, for example, by choosing a subset of the pending orders for fee-based clip displays that are registered with the market research server based on predetermined market research criteria, including clips statistics such as the number of times clips associated with a URL have been viewed, the click through rates for these clips, the keywords and tags associated with these clips and the values of these keywords and tags (e.g. price is greater than $30.00), as well as user-specific information such as user demographic information, and user and peer clip data associated with each user profile on the catalog server. The catalog server may be configured to select appropriate clips based on these factors listed above, and transmit the selected clips for display in the free and/or fee-based areas of the catalog pane.

Figure 11:
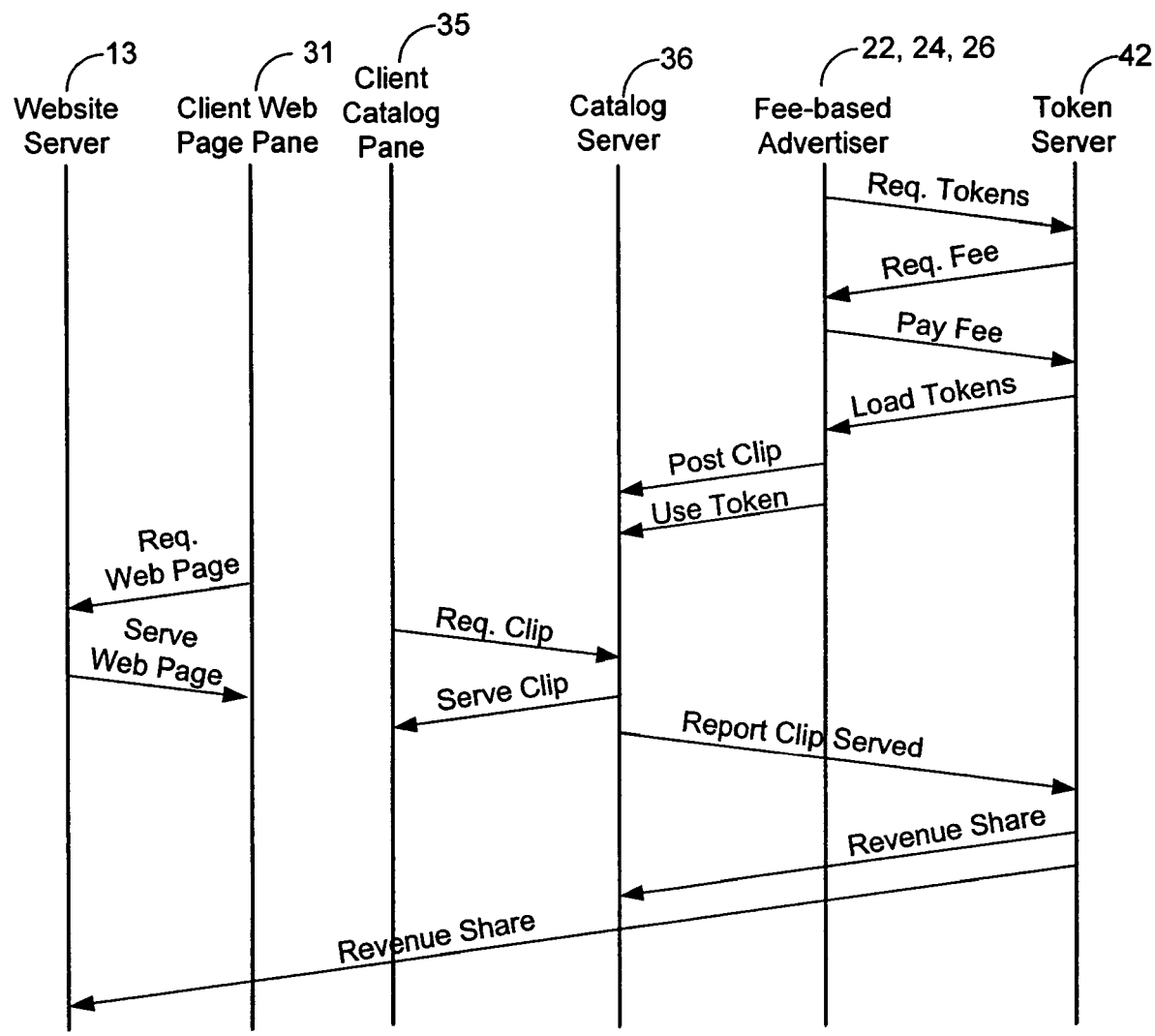
FIG. 11 is a networking diagram showing the process of a fee-based advertiser acquiring tokens and posting a clip, and subsequent revenue sharing, according to the marketing system of FIG. 1.

FIG. 11 shows a typical interaction of the web marketing system, according to which a fee based advertiser such as a website owner, seller, or marketer may purchase tokens for displaying fee-based clips, and by which the website owner and catalog server system may share the revenues generated the display of the clip. Initially, a fee-based advertiser client, such as one of clients 22, 24, 26, sends a request for tokens to token server 42, which calculates and responds with a fee required for the tokens. The fee is subsequently paid by the fee-based advertiser client, and tokens are loaded onto the client 22, 24 or 26, or alternatively are stored in a fee based advertiser account on the catalog server system.

To order a clip display, the fee-based marketer typically posts a clip to the catalog server, and transmits a token to purchase a clip display. Along with the token information about the URL along which the clip should be displayed, as well as user demographic information (in the case of marketer clips), and other advertising preferences are transmitted to the catalog server.

Upon catalog display pane 31 requesting a web page at the URL, the website server 13 serves the server to the client display pane, and the catalog client on the user client device typically causes the catalog pane to request a clip corresponding to the URL, as described above in relation to FIG. 10. The catalog server 36 may select the clip paid for by the token described above, based on the various selection parameters described above, and serve the clip to the catalog display pane. Once the clip is served, the catalog server typically reports that the clip has been served to the token server. The token server, in turn, references a revenue share model associated with the clip display, calculates a revenue share for each of the catalog server and the website owner, and distributes each calculated share of the revenue to the website server and catalog server, as appropriate.

Figure 12:
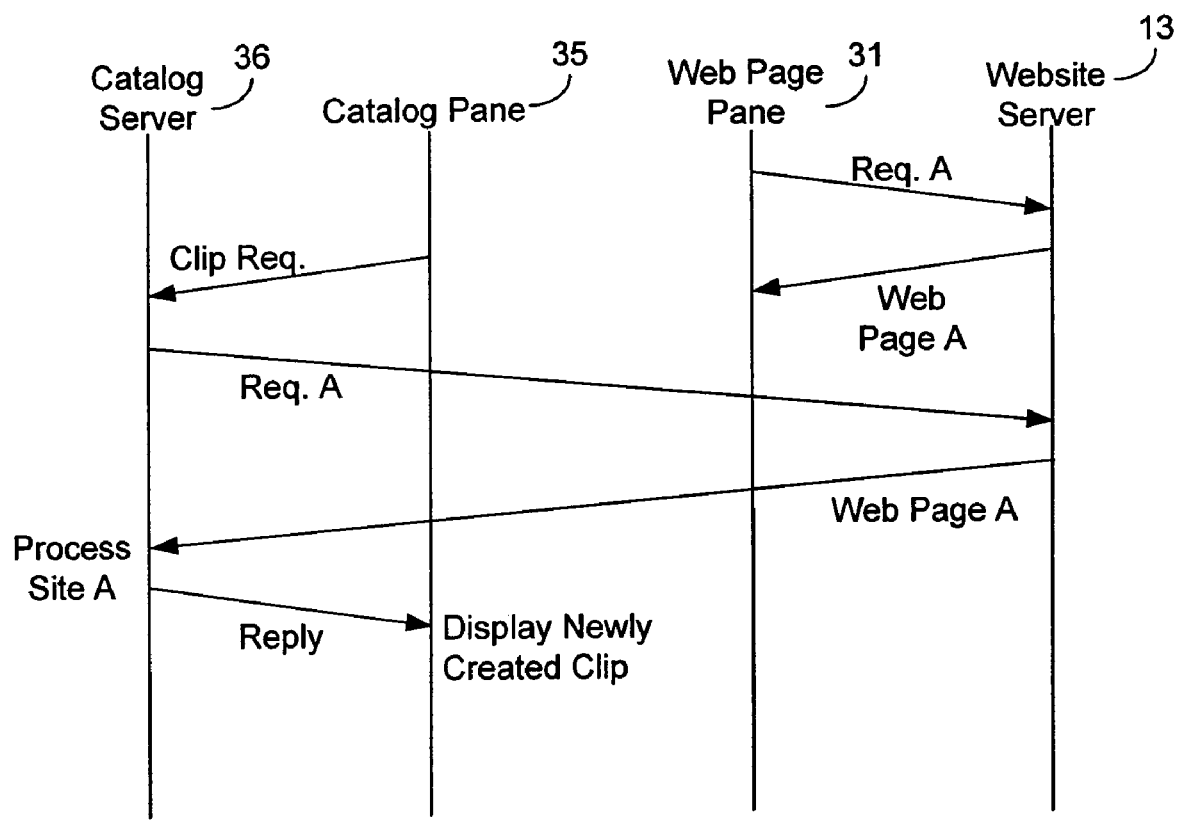
FIG. 12 is a networking diagram showing the process of a user creating and displaying a new clip, according to the marketing system of FIG. 1.

FIG. 12 illustrates a process of automatically generating a catalog clip at the catalog server. Initially, the web page pane 31 of browser 28 may request a web page from website server 13. The website server servers the web page to the web page pane, and in turn the catalog client is configured to cause the catalog pane to request a clip from the catalog server. To automatically generate a clip, the catalog server may in turn request downloading of the web page, and the website server may transmit the web page to the catalog server for processing. The catalog server may process the web page and parse the web page in order to automatically extract data such as price data, SKU data, URL, product image/thumbnail, etc. The catalog server 36 creates a newly generated catalog clip based on this data, and serves the catalog clip to the catalog pane 35 of browser 28. In this manner, even where clips are not p re-stored on the server for the URL, the catalog server may nonetheless be configured to automatically generate clips and serve them for display on the user client device. Thus, it will be appreciated that catalog clips may be generated on the fly, that is, after the request for a clip associated with the URL is received at the catalog server.

A computerized marketing method for use with a client device configured to execute a browser and display a web page downloaded from a third party server via a Uniform Resource Locator (URL) may be practiced according to the present invention. The method typically includes receiving at a catalog server the URL of a recently downloaded web page from a client device, and serving a catalog clip associated with the URL from the catalog server to the client device. The catalog clip is typically one of a plurality of catalog clips associated with the URL that are served from the catalog server to the client device, and the plurality of catalog clips typically includes fee-based catalog clips and free catalog clips respectively configured to be displayed in a fee based area and fee-free area of a catalog display pane.

The method may further include receiving a request from the client device to display peer catalog clips in the catalog display pane, and serving peer catalog clips in the catalog display pane. The method may also include receiving a request from the client device to broadcast user clips from the client device to be displayed in a catalog display pane of peer client devices, and displaying the user clips in the catalog display pane of the peer client devices.

The above embodiments may be used to create a URL aligned space, hosted by a catalog server, in which catalog clips generated by the user, as well as peers, website owners, and third party marketers and sellers, may be displayed to the user, thus providing the user with additional information on products, services at a particular URL. It will be appreciated that the various participants of the system described above opt-in to execute the catalog client and exchange information with the catalog server. Thus, the catalog client on the each client device is executed only if the user of that client device opts-in. Further, the system enables the catalog server or third party, through a token server, to collect fees for the display of fee-based clips, and share those fees with other participants, such as website owners. Market research value may be derived by analyzing the clips associated with a particular URL, as well as by analyzing the user clips and peer clips associated with each user. The catalog server may monetize this value by enabling marketers to purchase fee-based clip displays based on the user and peer clips associated with a user, as well as demographic information for the user, thereby targeting the audience, increasing the value of each clip display.

One example implementation in which the domain-aligned space created by the present invention may be utilized is a website that features an electronic program guide for cable, broadcast, and satellite television and radio programming. Listings in the electronic program guide may be separated by URL, and the catalog server may be configured to serve domain aligned clippings corresponding to each URL-defined listing. Marketers and sellers may capitalize on this URL space, by ordering appropriate clip displays. For example, a user who surfs to a track and field program in the electronic program guide may, for example, be presented with marketer and seller catalog clips for running shoes.

Yet another example use scenario is the placement of a classified-type advertisement using the above system. Users may register to place clips containing advertisements for used products next to web pages featuring new products. Thus, a seller of a used bicycle may place a fee-based clip featuring a used bicycle for display adjacent a web page of a bicycle retailer.

Of course, these are but two examples; it will be appreciated that the above described embodiments may also be utilized in countless other scenarios as well.

While the present invention has been particularly shown and described with reference to the foregoing preferred embodiments, those skilled in the art will understand that many variations may be made therein without departing from the spirit and scope of the invention. The description of the invention should be understood to include all novel and non-obvious combinations of elements described herein, and claims may be presented in this or a later application to any novel and non-obvious combination of these elements. Where the claims recite "a" or "a first" element or the equivalent thereof, such claims should be understood to include incorporation of one or more such elements, neither requiring nor excluding two or more such elements.

The invention claimed is:

1. A computerized marketing system, comprising:
   a first client device configured to display a customizable catalog clip template of a catalog tool of a catalog client program associated with a browser executed on the first client device, to create a catalog clip based on user input into the catalog clip template, the catalog clip being associated with a uniform resource locator (URL) of a web page displayed in the browser, and to send the URL of the web page and the created catalog clip from the catalog client program to a catalog server;

a catalog server system including a catalog server configured to receive the URL of the web page and the created catalog clip associated with the URL of the web page from the first client device, and to store the created catalog clip indexed by the URL of the web page in a catalog clipping registry database associated with the catalog server;

a second client device configured to execute a browser, the browser being configured to send a request to a third party website server to download the web page located at the URL, to receive the web page from the third party website server at the browser, and to display the web page in a web page pane of the browser;

wherein the second client device is further configured to execute a catalog client program associated with the browser executed on the second client device, the catalog client program being configured to determine the URL of the web page at the catalog client program executed on the second client device, to send a request to the catalog server for catalog clips that are indexed in the catalog clipping registry database associated with the catalog server according to the URL of the web page;

wherein the catalog server of the catalog server system is further configured to process the request based on the URL of the web page and current user settings for the second client device, to select a subset of catalog clips associated with the URL for display in a catalog pane, the subset of catalog clips including the created catalog clip created on the first client device, and to transmit the subset of catalog clips to the second client device; and wherein the second client device is further configured to receive the subset of catalog clips from the catalog server at the catalog client program, and to display the subset of catalog clips in the catalog pane of the browser, thereby creating a URL aligned space in the catalog pane, hosted by the catalog server, that displays catalog clips with additional information on products and services, associated with the URL, to a user on the second client device.

2. The system of claim 1, wherein the catalog tool includes a parser configured to parse data from the web page at the URL and automatically extract data to create the catalog clip.

3. The system of claim 2, wherein the automatically extracted data includes price data.

4. The system of claim 2, wherein the automatically extracted data includes SKU data.

5. The system of claim 2, wherein the automatically extracted data includes the URL address of the web page.

6. The system of claim 1, wherein the catalog tool includes a user interface configured to enable the user to manually enter product data to create at least one of the catalog clips.

7. The system of claim 1, wherein the catalog pane includes a fee-based area for display of fee-based catalog clips, and the catalog server system is configured to serve fee-based catalog clips to the fee-based area of the catalog pane.

8. The system of claim 7, wherein the catalog server system further includes a token server configured to manage the sale of clip displays in the fee-based area of the catalog pane.

9. The system of claim 8, wherein the token server is configured to allocate distribution of revenues taken in from fee-based clip displays based on a revenue sharing model.

10. The system of claim 9, wherein the token server is configured to distribute a portion of the revenue generated from clips served for display adjacent the website at a URL to the owner of the website.

11. The system of claim 1, wherein the catalog pane includes a fee-free area for display of free catalog clips.

12. The system of claim 11, wherein the catalog client program is configured to enable a user to select the source of catalog clips that are displayed in the fee-free area of the catalog display.

13. The system of claim 11, wherein the first client device is configured as a peer client device and the second client device is configured as a user client device, and the catalog client program associated with the second client device may be configured to display the catalog clips from the first client device in the fee-free area of the catalog pane.

14. The system of claim 11, wherein the first client device is configured as a user client device and the second client device is configured as another user client device, and the catalog client program associated with the second client device may be configured to display the catalog clips from the first client device in the fee-free area of the catalog pane.

15. The system of claim 11, wherein the first client device is configured as a user client device and the second client device is configured as a peer client device, and the catalog client program associated with the first client device may be configured to enable a user to broadcast catalog clips via the catalog server to be displayed on the second client device.

16. The method of claim 1, wherein the catalog client program on the first client device is executed if the first user opts-in, and the catalog client program on the second client device is executed if the second user opts-in.

17. A computerized marketing method, comprising:

displaying a customizable catalog clip template of a catalog tool of a catalog client program associated with a browser executed on a first client device;

creating a catalog clip based on user input into the catalog clip template, the catalog clip being associated with a uniform resource locator (URL) of a web page displayed in the browser;

sending the URL of the web page and the created catalog clip from the catalog client program to a catalog server;

receiving the URL of the web page and the created catalog clip at the catalog server;

storing the created catalog clip indexed by the URL of the web page in a catalog clipping registry database associated with the catalog server;

sending a request from a browser executed on a second client device to a third party website server to download the web page located at the URL;

receiving the web page at the browser on the second client device;

displaying the web page in a web page pane of the browser on the second client device;

determining the URL of the web page at a catalog client program executed on the second client device;

sending a request from the catalog client program executed on the second client device to the catalog server for catalog clips that are indexed in the catalog clipping registry database associated with the catalog server according to the URL of the web page;

receiving the request at the catalog server;

processing the request at the catalog server based on the URL of the web page and current user settings for the second client device;

selecting a subset of catalog clips associated with the URL for display in a catalog pane, the subset of catalog clips including the created catalog clip created on the first client device;

transmitting the subset of catalog clips to the second client device; and receiving the subset of catalog clips at the browser;

displaying the subset of catalog clips in the catalog pane of the browser on the second client device.

18. The method of claim 17, wherein the current user settings include user demographic information and user catalog display settings entered via a selection tool.

19. The method of claim 17, wherein selecting the subset of catalog clips includes filtering the catalog clips using a selection tool.

20. The method of claim 17, wherein the subset of catalog clips include fee-based catalog clips and free catalog clips respectively configured to be displayed in a fee-based area and a fee-free area of the catalog pane.

21. The method of claim 20, wherein the first client device is configured as a peer client device and the subset of catalog clips configured to be displayed in the fee-free area of the catalog pane include catalog clips created on the first client device.

22. The method of claim 21, wherein selecting a subset of catalog clips includes choosing a subset of pending orders for fee-based clip displays that are registered with a market research server based on predetermined market research criteria, for display in the fee-based area.

23. The method of claim 20, wherein the market research criteria includes clip statistics selected from the group consisting of a number of times clips associated with a URL have been viewed, a click through rates for the clips, keywords and tags associated with the clips, and values of keywords and tags associated with the clips, as user-specific information such as user demographic information, and user and peer clip data associated with each user profile on the catalog server.

24. The method of claim 20, wherein the first client device is selected from the group consisting of a user client device, a peer client device, a website owner client device, a marketer client device, and a seller client device; and wherein the second client device is selected from the group consisting of a user client device and a peer client device.

25. The method of claim 17, wherein the catalog client program on the first client device is executed if the first user opts-in, and the catalog client program on the second client device is executed if the second user opts-in.

* * * * *

UNITED STATES PATENT AND TRADEMARK OFFICE
CERTIFICATE OF CORRECTION

PATENT NO. : 7,617,131 B2  Page 1 of 1
APPLICATION NO. : 11/370140
DATED : November 10, 2009
INVENTOR(S) : John Ananian It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 445 days.

Signed and Sealed this

Nineteenth Day of October, 2010

David J. Kappos
*Director of the United States Patent and Trademark Office*